United States Patent
Klein et al.

(10) Patent No.: US 10,638,269 B1
(45) Date of Patent: Apr. 28, 2020

(54) VISUALIZATION OF SPATIO-TEMPORAL LOCATION

(71) Applicant: SAP SE, Walldorf (DE)

(72) Inventors: Udo Klein, Nussloch (DE); Holger Knospe, Malsch (DE); Lukas Melzer, Bretten (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/200,977

(22) Filed: Nov. 27, 2018

(51) Int. Cl.
  *H04W 4/029* (2018.01)
  *G01S 19/51* (2010.01)
  *H04W 4/02* (2018.01)

(52) U.S. Cl.
  CPC ............ *H04W 4/029* (2018.02); *G01S 19/51* (2013.01); *H04W 4/027* (2013.01)

(58) Field of Classification Search
  CPC ........ H04W 4/029; H04W 4/027; G01S 19/51
  See application file for complete search history.

(56) References Cited

U.S. PATENT DOCUMENTS

| | | | | |
|---|---|---|---|---|
| 2009/0157613 | A1* | 6/2009 | Strohmenger | G06Q 10/10 |
| 2013/0054138 | A1* | 2/2013 | Clark | G01C 21/203 |
| | | | | 701/468 |
| 2013/0231858 | A1* | 9/2013 | Bourne | H04W 4/023 |
| | | | | 701/439 |
| 2014/0141808 | A1* | 5/2014 | Deng | H04W 4/029 |
| | | | | 455/456.3 |

* cited by examiner

*Primary Examiner* — George Eng
*Assistant Examiner* — Hung K Du
(74) *Attorney, Agent, or Firm* — Buckley, Maschoff & Talwalkar LLC

(57) ABSTRACT

Provided are systems and methods for visualizing spatio-temporal data of a user location. In one example, the method may include receiving spatio-temporal movement information of a first user device associated with a first user, and receiving spatio-temporal movement information of a second user device associated with a second user, identifying a point in time when the first user and the second user could have met based on the received spatio-temporal movement information of the first and second user devices, outputting, via a user interface, a first timeline indicating movement of the first user device over time and a second timeline indicating movement of the second user device over time, and displaying a visual indicator with respect to the first and second timelines indicating the identified point in time when the first and second users could have met.

18 Claims, 6 Drawing Sheets

FIG. 2
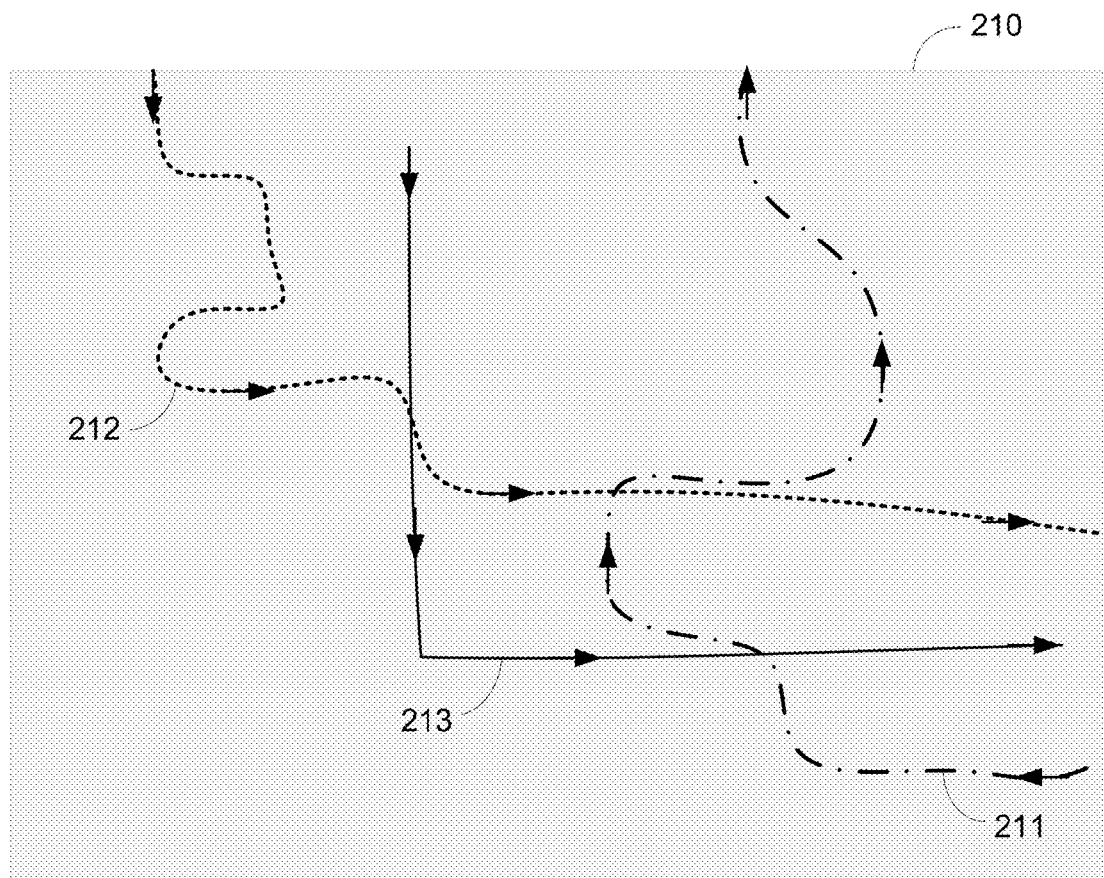
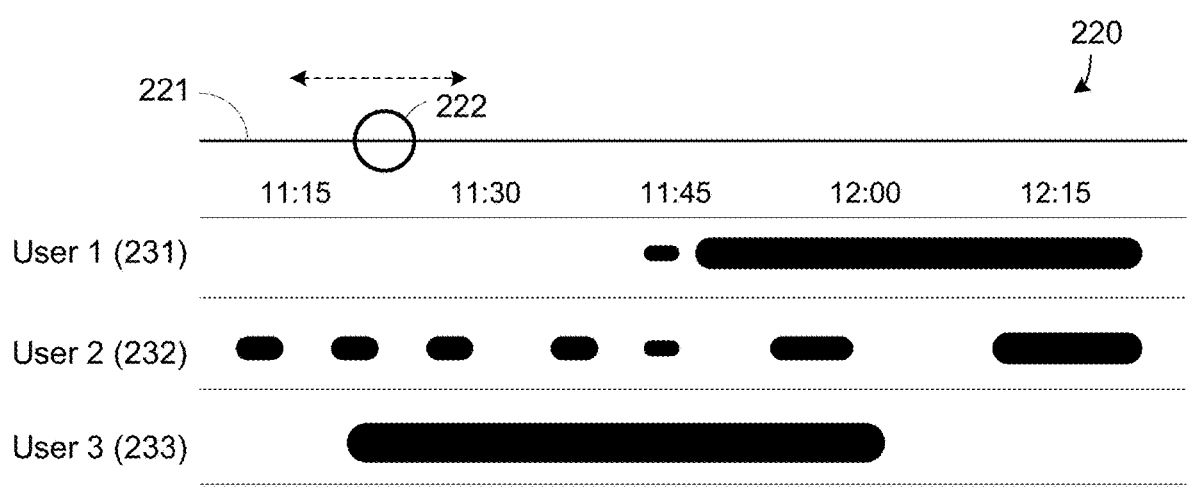

VISUALIZATION OF SPATIO-TEMPORAL LOCATION

BACKGROUND

Mobile tracking or location tracking is the process of ascertaining a position of a mobile device (e.g., smartphone, tablet, smart-wearable, laptop, etc.) as it moves over time. Mobile tracking may use localization which is based on a multilateration of radio signals between several cell towers of a cellular network and the mobile device. As another option, mobile tracking may use the Global Positioning System (GPS) to track the device. The recorded location data may be stored and/or transmitted to an Internet-connected device such as a telecommunications provider, and the like.

A mapping application may represent a path of movement of a user device on a virtual representation of a geographic map. Here, the tracked movement may be represented using a line in a shape of the movement. However, visually illustrating temporal data with a geographic map is a difficult task. Furthermore, when you have multiple people (and corresponding devices) in a geographic area, the map may indicate that travel paths have crossed. However, paths crossing is not evidence that the users of these devices met, because the spatial crossing may not have occurred at the same time. Accordingly, what is needed is a way to visualize both spatial and temporal data with respect to a movement of a mobile device.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2 is a diagram illustrating a user interface including a geographical map and a timeline chart in accordance with an example embodiment.

Figure 1:
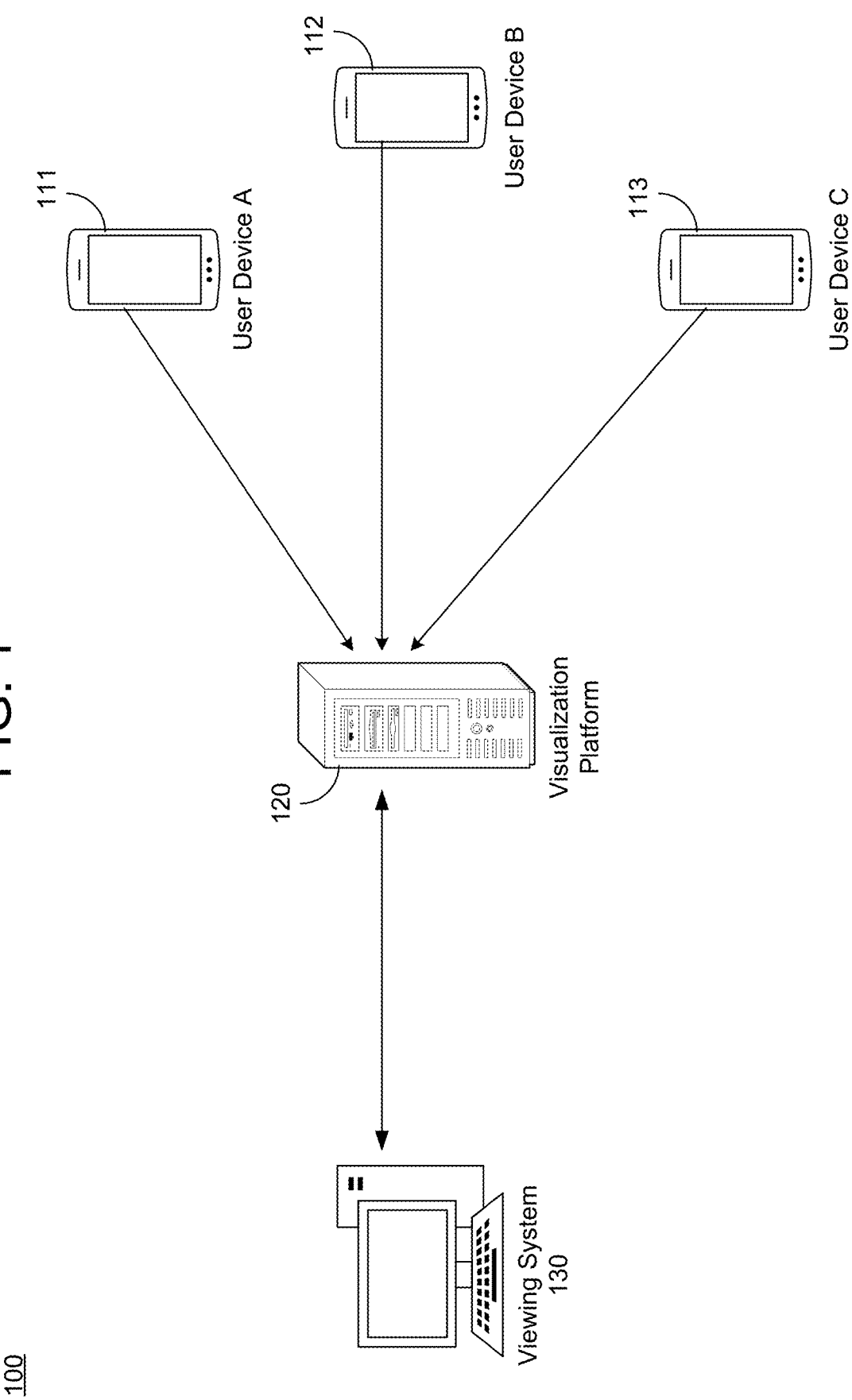
FIG. 1 is a diagram illustrating a computing environment for tracking a mobile device location in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Forensic science refers to the collection, preservation, and analysis of scientific evidence during the course of an investigation. In many cases, investigators look for evidence that two people acted together to carry out a criminal act. However, proving such conspiracy after the fact can be a difficult task. Recently, investigators have begun using mobile device data to ascertain a movement of a user/owner of the mobile device. For example, a mobile device may acquire its location at periodic intervals (e.g., 20 seconds, 30 seconds, 60 seconds, etc.) and store this information. The location may be acquired based on cell tower triangulation, signal strength, GPS, or the like. Furthermore, the location data may be uploaded from the mobile device to a network-connected device such as a telecommunications provider, etc. The location data set may include geographic coordinates (e.g., latitude, longitude, etc.), timestamps, and the like. This information can be used to generate a two-dimensional map representing the movement of the user over time.

During investigations it may become necessary to correlate several independent spatio-temporal datasets such as tracking data from mobile devices in order to find out when and where suspects or victims may have met. If the focus is on the spatial information, then a geographic map-based solution is appropriate. However, when the focus is on the temporal aspect (i.e., when did subjects meet?) then spatial visualizations are inappropriate. In this case, investigators must pour through the location data sets manually to identify when two users were located at the same location at the same time. This process can be cumbersome when dealing with hours of location data which can include thousands of entries. Furthermore, it becomes increasingly more difficult when locations and times of more than two users are being correlated.

The example embodiments overcome the drawbacks in the art by providing a visual representation of spatial and temporal attributes of the movement of users over time. Location data on a map cannot provide the full picture of when users were located where. In addition to providing location data via a geographical map, the example embodiments can provide a timeline representing the period of time the movement of the user device, and the corresponding user, was tracked. Furthermore, a visual indicator can be provided between the timelines of two users to identify points in time when two users may have met based on both spatial data (location) and temporal data (time). The visual indicator may be a bar, a line, a shaded area, or the like, which represents points when both the timing and the location of two users was within predefined limits that they could have physically met with one another.

The user interface may include a virtual map that provides a travel path of each user being tracked. In addition, the user interface may include timelines which may be horizontal or vertical lines over time which indicate when a user was moving, stationary, etc. When tracking multiple users, their timelines may be placed in parallel to one another on the user interface. Furthermore, when the system determines that two users could have met, an intersecting line or bar can be used between the timelines of two users to visually identify a period of time where the two users could have met. Therefore, the system can provide a user with a visual understanding of points in time when two users could have met with one another, without requiring a user to view the raw data, or to make comparisons on a map. In doing so, the example embodiments can visually depict when two users simultaneously overlap in both time and location. This can provide an investigator with a hint that two people could have met. The investigator (or other user) may further identify user travel patterns based on a time slider that allows them to move the slider along a time axis to visualize different positions of the users on the map.

FIG. 1 illustrates a computing environment 100 for tracking mobile device location, in accordance with an example embodiment. Referring to the example of FIG. 1, the environment 100 includes a visualization platform 120 that receives tracking data from a plurality of user devices 111, 112, and 113. The visualization platform 120 may be a web server, a database, a cloud platform, a user device, or the like, which is connected to the user devices 111, 112, and 113 via a network. Meanwhile, the user devices 111, 112, and 113 may include mobile phones, automobiles, smart-wearables, tablets, or the like. The user devices 111, 112, and 113, may move over time. The movement may be periodic in that there may be both periods of movement and periods of stationary inactivity.

The tracking data may include locations of the user devices 111-113 over time. For example, the tracking data may include spatio-temporal data sets which include geographic coordinates (latitude, longitude, etc.), timestamps at when the coordinates were detected, and the like. The spatio-temporal data sets may be implemented via tables (columns, rows, etc.). As another example, the spatio-temporal data may be XML data, or the like. In some embodiments, the tracking data may be acquired via a GPS receiver embedded with the user devices, by triangulation with cell towers (not shown), or the like. The location data may be uploaded by the user devices 111, 112, and 113, to the visualization platform 120 at periodic or infrequent intervals to the visualization platform 120.

According to various embodiments, the visualization platform 120 may generate a visual representation of the spatio-temporal data sets from the user devices 111, 112, and 113, and display the visual representation via a user interface which may be output locally and/or via a remote network-connected device such as a viewing system 130. The visualization may be generated by a mapping application executed by the visualization platform 120. In this example, the viewing system 130 may be a forensic system used by forensic investigators, but embodiments are not limited thereto. The viewing system 130 may include a personal computer, a mobile device, a tablet, a smart phone, a server, or the like.

FIG. 2 illustrates a user interface 200 including a map 210 and a timeline chart 220 in accordance with an example embodiment. In this example, the map 210 is a virtual representation of a geographic area (from the real world). For example, the map 210 may be generated by the visualization server 120 shown in FIG. 1, although it is not limited thereto. In this example, the map 210 includes a plurality of travel paths 211, 212, and 213, representing the path of movement of three respective user devices. Although not shown in FIG. 2, the map 210 may include additional features such as virtual representations of buildings, landmarks, vegetation, trees, or other structures, etc.

Referring to FIG. 2, mobile phone data may provide geographic location data (GPS coordinates, etc.) which can be converted into (e.g., X and Y coordinates on the map 210) at regular intervals. The location data may be used to show a path of movement of a user based on the movement of the user's mobile device, via the map 210. The location data typically represents locations of a user device over time. Therefore, the travel paths 211, 212, and 213, may not represent continuous movement but instead may include periods of inactivity where the user device is stationary or at rest. In addition, the speed of the user may be different at different locations. Furthermore, the GPS data may have some precision error involved (e.g., +/−200 m) and some time error involved (e.g., +/−2 secs) given that satellites are not perfectly accurate.

Because of these factors, it is difficult to temporally comprehend the movement of the user based on a two-dimensional map. In other words, a map can illustrate a path of movement using lines, arrows, etc. over time. However, a point in time at which a user was located at each position on the travel path is difficult to represent. Furthermore, when you have multiple people in a geographic area you can see that two people may have crossed paths when their travel paths intersect with one another via the travel paths on the map. However, this is not evidence that they met with each other, because it may not be at the same time. In other words, it may be a spatial intersection but not a temporal intersection.

Referring again to FIG. 2, the user interface 200 further includes the timeline chart 220 which may be provided in addition to (or instead of) the map 210. The timeline chart 220 includes a plurality of timelines 231, 232, and 233, corresponding to the plurality of users 211, 212, and 213, respectively. The timelines 231, 232, and 233, indicate the movement of each user device (and the corresponding user thereof) over time. In this example, each timeline is a horizontal line or bar with dynamically changing vertical thickness or width which indicates a speed of the user device at the point in time. Meanwhile, gaps in the timelines 231, 232, and 233 indicate periods of no movement (inactivity).

In addition, the time chart 220 includes a time slider 222 which slides along a time axis 221 enabling a user to select the time slider 222 and move it along the time axis 221 to change a point in time (and corresponding locations of the users 211, 212, and 213) on the map 210. For example, when a user moves the time slider 222 to a specific point in time, the map 210 may illustrate a representation of each user device (e.g., a dot, icon, etc.) along the respective travel paths 211, 212, and 213, where each of the user devices was located at that selected time. The time slider 222 can be adjusted while a user views the map 210 to visualize whether the users were moving towards each other or away from each other, whether on was following the other, or the like. As a result, the time slider 222 enables a user to visualize patterns of movement of the users on the travel paths 211, 212, and 213, based on the sliding.

Figure 4:
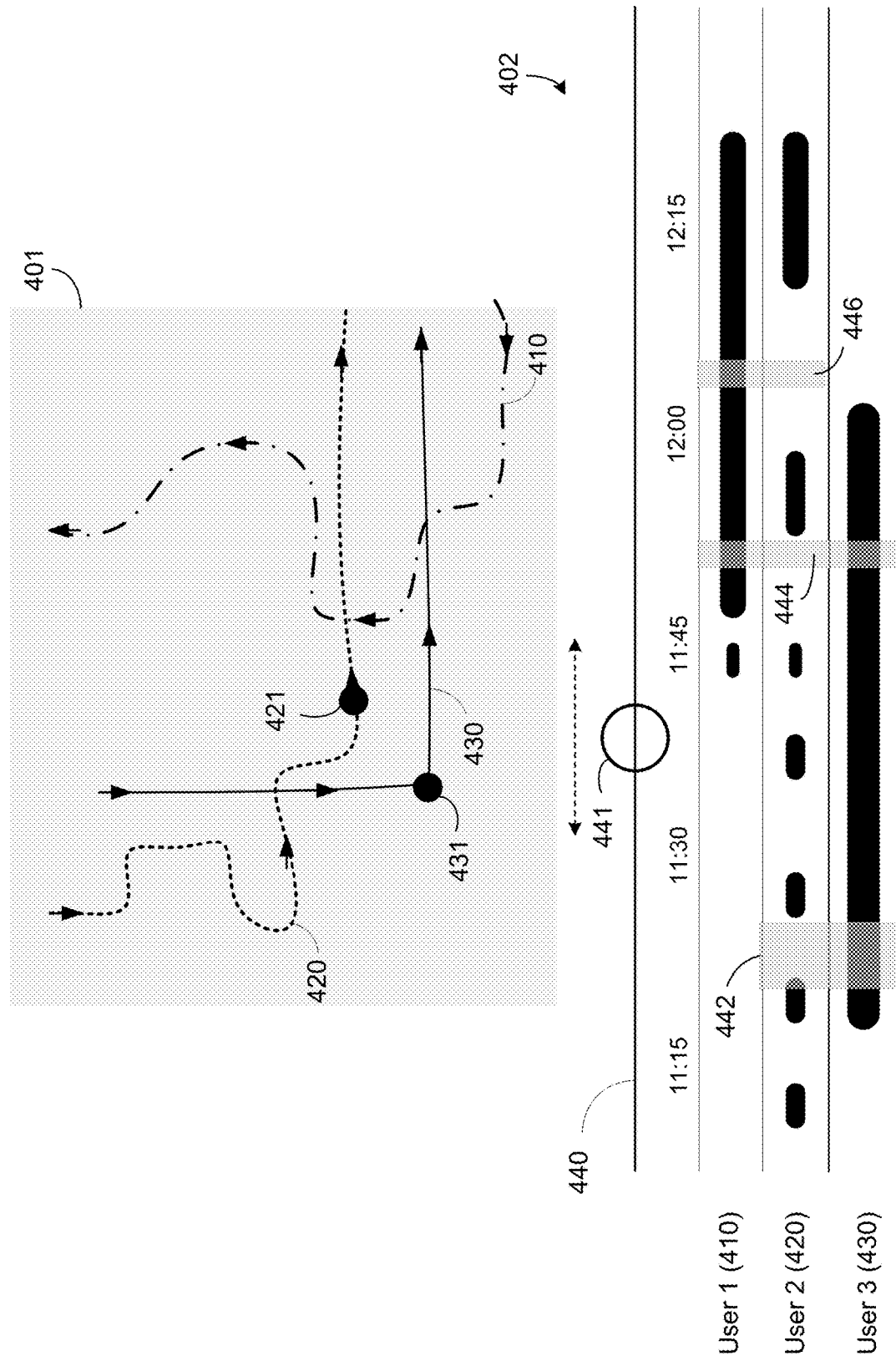
FIG. 4 is a diagram illustrating a user interface incorporating visual indicators of points in time when users could have met in accordance with example embodiments.

Initially, the time slider 222 may be positioned at one or more default spots on the time axis 221 when the time chart 220 is initiated. In some examples, the time slider 222 may be moved via a drag-and-drop operation detected from a touch input, a mouse input, a keyboard, input, and the like. In response, the time slider 222 may be moved along the time axis 221 according to the drag-and-drop operation received. In some embodiments, the system may display a dot or other indicator of a user (or a user's device) on the map, based on a point in time on the time axis 221 selected via the time slider 222. An example of the dot is shown in the example of FIG. 4.

In some embodiments, the system may modify a granularity of the time axis 220, in response to receiving a command via the user interface. For example, the system may modify time units of the time axis from 1 minute apart to 5 minutes apart, 15 minutes apart, 1 hour apart, and the like. The modification may not affect a time range that has been selected by the time slider 222. In other words, the system may maintain a selected time range when the granularity is modified.

Figure 3A:
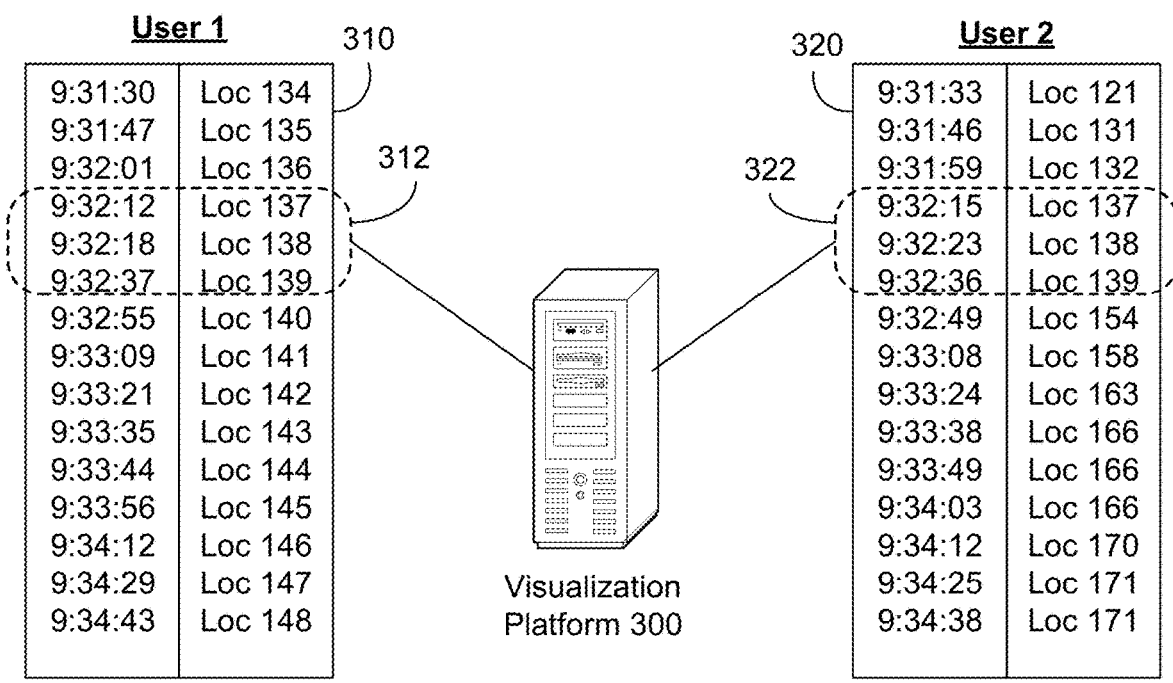
FIG. 3A is a diagram illustrating spatio-temporal datasets from a mobile device in accordance with an example embodiment.

FIG. 3A illustrates a pair of spatio-temporal datasets 310 and 320 uploaded from respective mobile devices of a first user and a second user to a visualization platform 300, in accordance with an example embodiment. In this example, the data sets 310 and 320 include both spatial information represented by the term "Loc" which is meant to contextually represent location data which may include geographic coordinates such as longitude and latitude measurements of the mobile device which may be read via GPS, triangulation, or the like. In addition, the spatio-temporal data sets 310 and 320 also include timestamps indicating a point in time when the location data was sensed. Although not shown in FIG. 3A, the spatio-temporal data sets 310 and 320 may include different or additional information not shown such as device information (device ID, etc.), user information, carrier information, and the like.

Referring again to the example of FIG. 2, there are three tracking paths 211, 212, and 213 representing three users (user 1, user 2, and user 3). From the map 210 it can be seen that travel paths of the users have intersected. Furthermore, the navigation time chart 220 bar below the map 210 it can also be seen that when the users were moving, and how fast. However, there is no means to see if and when the users may have actually met. According to various embodiments, a time chart visualization 330 shown in FIG. 3B enables a viewer to easily see if and when subjects may have met. This in turn allows the user to use the time slider 222 shown in FIG. 2 to see where the subjects have met. In particular, it enables a viewer easily detect or infer when and where subjects may have met.

Figure 3B:
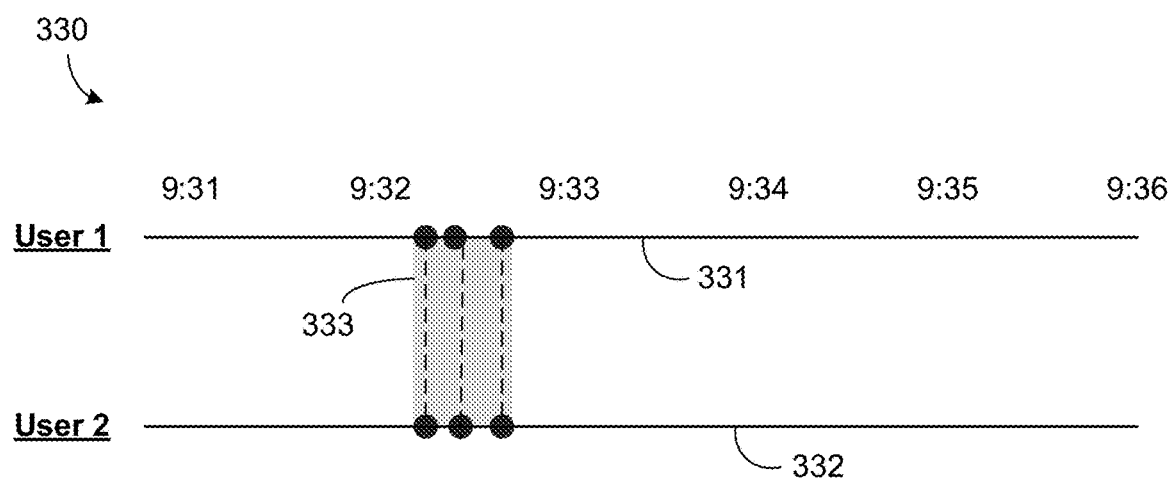
FIG. 3B is a diagram illustrating a visual indicator of the identified point in time incorporated into timelines, in accordance with an example embodiment.

In the example of FIG. 3B, a line 331 and a line 332 are used to represent timelines of a subject's movement (user 1 and user 2). The dots along the timelines indicate known location measurements. The shaded area 333 is used in this example to visually indicate a period of time where the users could or may have met. The solution enhances the timelines 331 and 332 with an additional indicator 333 which provides information identifying periods of time where the two users were within a predetermiend geographic distance from one another. This information can be identified by the visualization server 300 from the spatio-temporal datasets 310 and 320 shown in FIG. 3A. In particular, the visualization server 300 has identified a portion 312 of the spatio-termporal data set 310 that intersects with a portion 322 of the spatio-termporal data set 320 in both time and space. That is, the two users are determined to be at or near the same geographic location at the same time. Furthermore, this identification is then shown with the visual indicator 333 on the time chart visualation 330.

Typically, temporal geospatial data (also referred to herein is spatio-temporal data) is not in a format which is suitable for determining intersection in time. For example, two people may be moving around creating spatio-temporal data which may be represented with a travel path on a map. The example embodiments may implement a sweeping algorithm that assumes that there is a fixed set of temporal spatial data in the form of (time ordered) location lists ("paths"). The algorithm does not assume that the time points for the paths are uniform across the paths. In other words, the algorithm does not assume that speed of movement of a user device is constant from the beginning of the travel path to the end. Furthermore, the algorithm does not assume that paths are accurate. However, some known accuracy may be assumed. For example, locations may be assumed to be within +/−200 m, or some other predefined distance.

In the sweeping algorithm, a path P is a set of points p which consists of locations l and times t. That is $p_i=(l_i, t_i)$ for some fixed range of i. Also $P_j=\{p_{ji}\}$ for some fixed range j where i ranges depend on j. In a first step, for all paths P determine possible intersections with other paths. Furthermore, add the intersections to derive new paths Q. Each path Q shall be derived from a path P by adding possible intersection points or segments.

For path segments it is not 100% clear what intersection means in the first place. Speed of movements along path segments is not uniform. Hence, there is always significant uncertainty with regards to time. The example embodiments may address this issue by intersecting the temporal component first. For example, if there is no temporal intersection (including error margin) then the algorithm determines that path segments do not intersect. However, if there is a temporal intersection, the algorithm may further check for spatial intersection. In many cases this intersection may be not limited to a point in time and/or space but may be a cross product of a time period with a line segment. To deal with this, the algorithm may insert the two endpoints of the possible intersection segment. For example, two "parallel" paths may intersect in both time and space. Hence two additional points may be inserted into the blue graph in order to deal with this situation.

As another example, the algorithm may be use bonding boxes of path segments (in both space and time) overlap. If there is no overlap, then there can be no intersection. This is an operation that can be efficiently computed with a spatial index. For those segments that have overlapping bounding boxes in temporal space, the algorithm may proceed to determine if the segments overlap in location space.

Next, for segments of time that actually overlap, the algorithm may determine the largest time interval during which the overlap may actually have happened. That is, compute the intersection in time. The system may then split the segments accordingly into shorter (in time) segments. The time period containing the intersection may be highlighted, shaded, barred, lined-through, or the like, accordingly.

FIG. 4 illustrates another example of a user interface 400 which includes a map 401 and a time navigation chart 402 below the map 401. Similar to the user interface 200 shown in FIG. 2, the time navigation chart 402 includes three timelines 410, 420, and 430, representing movement in time of the three users who also have three corresponding travel paths 410, 420, and 430 shown in the map 401. In this example, visual indicators 442, 444, and 446 are overlaid on top of the timelines 410, 420, and 430, to identify the points in time where the users could have met. In this example, user 2 and user 3 could have met at a period of time identified by visual indicator 442. Meanwhile, user 1 and user 3 could have met at a period of time identified by the visual indicator 444. Likewise, the user 1 and the user 2 could have met at a period of time identified by the visual indicator 446. Although not shown, more than two users could meet at the same time. This could be reflected with a darker shading, a different color, etc.

In addition, the user interface 400 also includes a time slider 441 disposed on a time axis 440 and configured to be moved horizontally along the time axis. FIG. 4 also illustrates icons 421 and 431 which represent current locations of user 2 and user 3, respectively, at the selected point in time by the time slider 441 on the time axis 440. When a user selects the time slider 441 and moves it across the time axis 440, icons 421 and 431 may move along the respective travel paths 420 and 430 based on the selected point in time by the time slider 441. In this case, the movement of the time slider 441 causes the system to simultaneously move the icons 421 and 431 on the screen. Although not shown in FIG. 4, the user 410 may also include an icon. However, it is not shown in this example because the current position of the time slider 441 on the time axis 440 is at a point in time before when the user device 410 appeared on the map.

Figure 5:
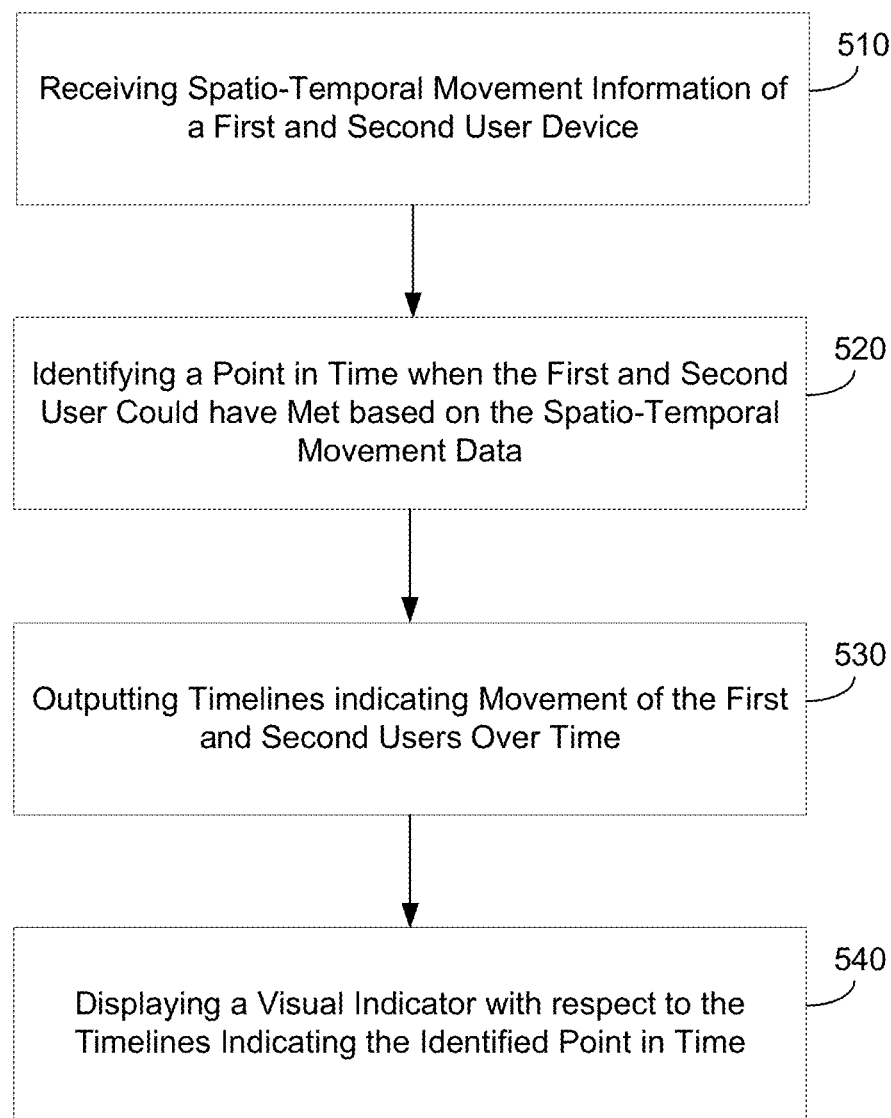
FIG. 5 is a diagram illustrating a method of identifying and displaying a possible meeting point in time in accordance with an example embodiment.

FIG. 5 illustrates a method 500 of identifying and displaying a possible meeting point in time in accordance with an example embodiment. The method 800 may be performed by a computing device such as a web server, a cloud platform, a user device, a kiosk, a television, and the like. Referring to FIG. 5, in 510, the method may include receiving spatio-temporal movement information of a first user device associated with a first user and receiving spatio-temporal movement information of a second user device associated with a second user. For example, the spatio-temporal movement information may include geographic coordinates and timestamps associated with the geographic coordinates indicating positions and times where the user devices were located. In some embodiments, the received spatio-temporal movement information GPS data uploaded from the first and second user devices, respectively, however embodiments are not limited to GPS data. As another example, the location data may include triangulation data.

In 520, the method may include identifying a point in time when the first user and the second user could have met based on the received spatio-temporal movement information of the first and second user devices. For example, the identifying may be performed based on the combination of spatial data and the temporal data. For example, the system may determine that the first and second users are located within a predetermined distance from each other within a predetermined time period. In some cases, the identifying may be performed by bounding boxes which reduce the location data into small segments of time (e.g., 30 minute intervals, etc.) of information and identify which segments have intersecting geographic positions. When a segment does not have intersecting or overlapping geographic positions between the two users, the segment may be disregarded. However, if the two users do have intersecting geographic positions within a segment, the segment data can be further analyzed to determine whether the intersecting geographic positions occurred at the same time.

In 530, the method may include outputting, via a user interface, a first timeline indicating movement of the first user device over time and a second timeline indicating movement of the second user device over time, and in 540, the method may further include displaying a visual indicator with respect to the first and second timelines indicating the identified point in time when the first and second users could have met. For example, the visual indicator may include a bar that visually intersects the first and second timelines at the identified point in time. As another example, the visual indicator may include a shaded graphical element that is overlaid on the first and second timelines at the identified point in time.

In some embodiments, the outputting may include outputting a virtual map of a geographic area which identifies geographic locations of the movement of the first and second user devices, respectively. In some embodiments, the outputting may further include outputting a time slider via the user interface which controls a position of a virtual representation of the first user and a virtual representation of the second user on the virtual map based on a point in time selected via the time slider. The time slider may be moved by a user input and control an icon or representation of the users on the map. When the time slider is moved, the position of the user icons on the map may be moved to the corresponding location on the map where the user is located at the time.

In some embodiments, the first and second timelines each comprise a horizontal line running parallel to each other within the user interface. As another example, the timelines may run vertically. The timelines may look like lanes or swim-lanes of data. In some embodiments, a width of the timeline (e.g., a vertical width in the horizontal line example, etc.) may represent a speed of movement of a respective user device at a point in time. Furthermore, the width may be dynamically adjusted based on a change in the speed of movement of the respective device. In other words, the width of the timeline may be used to indicate dynamically changing speed of the user. Also, gaps may be present in the timeline which indicate periods of stationary inactivity of the user device.

Figure 6:
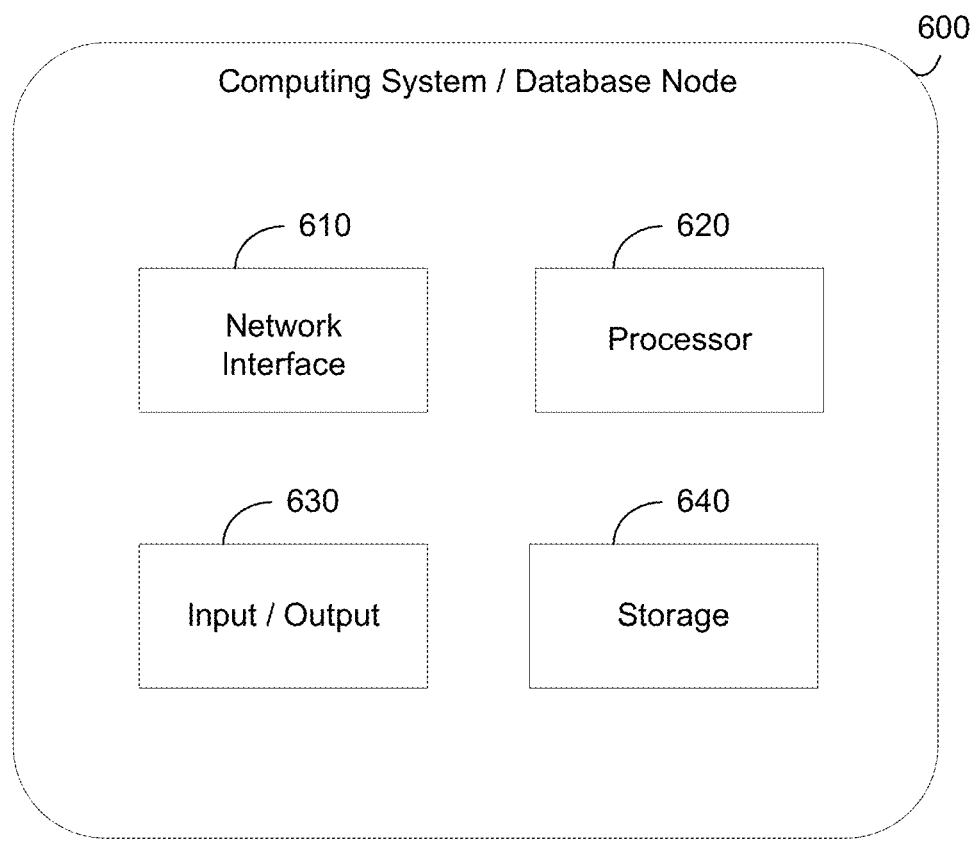
FIG. 6 is a diagram illustrating a computing system that can be used herein in accordance with any of the example embodiments.

FIG. 6 illustrates a computing system 600 that can be used in any of the example embodiments described herein. For example, the computing system 600 may be a web server, a database, a cloud platform, a user device, a server, or the like. In some embodiments, the computing system 600 may be distributed across multiple devices. Referring to FIG. 6, the computing system 600 includes a network interface 610, a processor 620, an input/output 630, and a storage device 640 such as a memory. Although not shown in FIG. 6, the computing system 600 may also include or be electronically connected to other components such as a display which may include an embedded display panel, an externally connected monitor, a network connection device having a display, etc., an input unit, a receiver, a transmitter, and the like. The processor 620 may control or replace any of the components shown in the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may be a port, a cable, a connector, etc., that can be used to input and output data to and from the computing system 600. The storage device 640 is not limited to a particular storage device and may include any known memory device such as RAM, ROM, hard disk, and the like. The storage 640 may store software modules or other instructions which can be executed by the processor 620 to perform the method 500 shown in FIG. 5.

According to various embodiments, the network interface 610 may receive spatio-temporal movement information of a first user device associated with a first user and receive spatio-temporal movement information of a second user device associated with a second user. The spatio-temporal movement information may include geographic data, timestamps, and the like, which are acquired by and uploaded from the user devices. The processor 620 may identify a point in time when the first user and the second user could have met based on the received spatio-temporal movement information of the first and second user devices, and output, via a user interface, a first timeline indicating movement of the first user device over time and a second timeline indicating movement of the second user device over time.

Furthermore, the processor 620 may display a visual indicator with respect to the first and second timelines indicating the identified point in time when the first and second users could have met. For example, the visual indicator may include a line or a bar that visually intersects the first and second timelines at the identified point in time. In some embodiments, the visual indicator may include a shaded graphical element that is overlaid on the first and second timelines at the identified point in time.

In some embodiments, the processor 620 may output a virtual map of a geographic area which identifies geographic locations of the movement of the first and second user devices, respectively. In some embodiments, the processor 620 may output a time slider via the user interface which is parallel to the timelines and which controls a position of a virtual representation of the first user and a virtual representation of the second user on the virtual map based on a point in time selected via the time slider. In this example, the first and second timelines may each include a horizontal line running parallel to each other within the user interface, and below or above the map. In some embodiments, a vertical width of the horizontal line represents a speed of movement of a respective user device at a point in time, and the vertical width may be dynamically adjusted by the processor 620 based on a change in the speed of movement of the respective device.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network channel.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals and may be referred to as non-transitory.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a network interface configured to receive spatio-temporal movement information based on movement of a first user device associated with a first user, and receive spatio-temporal movement information based on movement of a second user device associated with a second user; and
a processor configured to identify a previous point in time when the first user and the second user could have met based on the received spatio-temporal movement information of the first and second user devices, and output, via a user interface, a first timeline indicating movement of the first user device over time and a second timeline indicating movement of the second user device over time,
wherein the first and second timelines each comprise a horizontal line running parallel to each other within the user interface, and
the processor is further configured to display a visual indicator with respect to the first and second timelines indicating the identified previous point in time when the first and second users could have met.

2. The computing system of claim 1, wherein the visual indicator comprises a bar that visually intersects the first and second timelines at the identified previous point in time.

3. The computing system of claim 1, wherein the visual indicator comprises a shaded graphical element that is overlaid on the first and second timelines at the identified previous point in time.

4. The computing system of claim 1, wherein the received spatio-temporal movement information comprises global positioning system (GPS) data and timestamps uploaded from the first and second user devices, respectively.

5. The computing system of claim 1, wherein the processor is further configured to output a virtual map of a geographic area which identifies geographic locations of the movement of the first and second user devices, respectively.

6. The computing system of claim 5, wherein the processor is further configured to output a time slider via the user interface which controls a position of a virtual representation of the first user and a virtual representation of the second user on the virtual map based on a previous point in time selected via the time slider.

7. The computing system of claim 1, wherein a vertical width of the horizontal line represents a speed of movement of a respective user device at a point in time, and the vertical width is dynamically adjusted by the processor based on a change in the speed of movement of the respective device.

8. A method comprising:
receiving spatio-temporal movement information based on movement of a first user device associated with a first user, and receiving spatio-temporal movement information based on movement of a second user device associated with a second user;
identifying a previous point in time when the first user and the second user could have met based on the received spatio-temporal movement information of the first and second user devices;
outputting, via a user interface, a first timeline indicating movement of the first user device over time and a second timeline indicating movement of the second user device over time, wherein the first and second timelines each comprise a horizontal line running parallel to each other within the user interface; and
displaying a visual indicator with respect to the first and second timelines indicating the identified previous point in time when the first and second users could have met.

9. The method of claim 8, wherein the visual indicator comprises a bar that visually intersects the first and second timelines at the identified previous point in time.

10. The method of claim 8, wherein the visual indicator comprises a shaded graphical element that is overlaid on the first and second timelines at the identified previous point in time.

11. The method of claim 8, wherein the received spatio-temporal movement information comprises global positioning system (GPS) data and timestamps uploaded from the first and second user devices, respectively.

12. The method of claim 8, wherein the outputting further comprises outputting a virtual map of a geographic area which identifies geographic locations of the movement of the first and second user devices, respectively.

13. The method of claim 12, wherein the outputting further comprises outputting a time slider via the user interface which controls a position of a virtual representation of the first user and a virtual representation of the second user on the virtual map based on a previous point in time selected via the time slider.

14. The method of claim 8, wherein a vertical width of the horizontal line represents a speed of movement of a respective user device at a point in time, and the vertical width dynamically adjusts based on a change in the speed of movement of the respective device.

15. A non-transitory computer readable medium comprising program instructions which when executed cause a computer to perform a method comprising:
receiving spatio-temporal movement information based on movement of a first user device associated with a first user, and receiving spatio-temporal movement information based on movement of a second user device associated with a second user;
identifying a previous point in time when the first user and the second user could have met based on the received spatio-temporal movement information of the first and second user devices;
outputting, via a user interface, a first timeline indicating movement of the first user device over time and a second timeline indicating movement of the second user device over time, wherein the first and second timelines each comprise a horizontal line running parallel to each other within the user interface; and
displaying a visual indicator with respect to the first and second timelines indicating the identified previous point in time when the first and second users could have met.

16. The non-transitory computer readable medium of claim 15, wherein the visual indicator comprises a bar that visually intersects the first and second timelines at the identified previous point in time.

17. The non-transitory computer readable medium of claim 15, wherein the visual indicator comprises a shaded graphical element that is overlaid on the first and second timelines at the identified previous point in time.

18. The non-transitory computer readable medium of claim 15, wherein the received spatio-temporal movement information comprises global positioning system (GPS) data and timestamps uploaded from the first and second user devices, respectively.

* * * * *